US006869561B2

United States Patent
Johnson et al.

(10) Patent No.: US 6,869,561 B2
(45) Date of Patent: *Mar. 22, 2005

(54) CURABLE LIQUID SEALANT USED AS VACUUM BAG IN COMPOSITE MANUFACTURING

(75) Inventors: Keith Johnson, Indialantic, FL (US); Scott Lewit, Indialantic, FL (US)

(73) Assignee: Composite Innovations, Inc., Indialantic, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/772,735

(22) Filed: Feb. 5, 2004

(65) Prior Publication Data

US 2004/0155385 A1 Aug. 12, 2004

Related U.S. Application Data

(63) Continuation-in-part of application No. 10/241,238, filed on Sep. 11, 2002, now Pat. No. 6,723,273.

(51) Int. Cl.[7] .............................................. B29C 70/44
(52) U.S. Cl. ....................... 264/510; 264/102; 264/236; 264/257; 264/258; 264/309; 264/324; 264/511; 264/512; 264/571; 156/245; 156/285; 156/286; 425/389
(58) Field of Search ................. 264/510–511, 257–258, 264/102, 309, 512, 571, 236, 324; 156/245, 285, 286; 425/389

(56) References Cited

U.S. PATENT DOCUMENTS

| | | | |
|---|---|---|---|
| 3,993,828 A | * | 11/1976 | McCorsley, III ............ 428/236 |
| 4,188,314 A | * | 2/1980 | Fox et al. ..................... 260/37 |
| 4,681,718 A | | 7/1987 | Oldham |
| 4,755,341 A | | 7/1988 | Reavely et al. |
| 4,769,437 A | * | 9/1988 | Blount ........................ 528/95 |
| 4,902,215 A | | 2/1990 | Seemann, III |
| 5,009,687 A | | 4/1991 | Kromrey |
| 5,129,813 A | | 7/1992 | Shepherd |
| 5,650,477 A | * | 7/1997 | Parodi et al. ................ 528/93 |
| 5,716,488 A | | 2/1998 | Bryant |
| 5,837,185 A | | 11/1998 | Livesay et al. |
| 5,897,818 A | | 4/1999 | Lewit et al. |
| 6,048,488 A | | 4/2000 | Fink et al. |
| 6,630,095 B2 | | 10/2003 | Slaughter et al. |
| 6,638,466 B1 | | 10/2003 | Abbott |

* cited by examiner

Primary Examiner—Stefan Staicovici
(74) Attorney, Agent, or Firm—Sacco & Associates, PA

(57) ABSTRACT

The inventive method concerns a process of transferring resin into reinforcing material used in the manufacture of composite articles. A first step in the method involves positioning at least one layer of the reinforcing material on the surface of an open mold. Subsequently, a sealant layer is applied in liquid form over the reinforcing material to create an airtight chamber encapsulating the reinforcing material between the sealant layer and the mold. After the sealant layer is allowed to cure, resin is drawn through the reinforcing material.

34 Claims, 7 Drawing Sheets

CURABLE LIQUID SEALANT USED AS VACUUM BAG IN COMPOSITE MANUFACTURING

CROSS REFERENCE TO RELATED APPLICATIONS

This Application is a Continuation-in-Part to U.S. patent application Ser. No. 10/241,238 filed Sep. 11, 2002. now U.S. Pat. No. 6,723,273 B2.

BACKGROUND OF THE INVENTION

1. Technical Field

This invention is a process for manufacturing composite articles, and more particularly a process for improving closed vacuum assisted molding techniques used in the fabrication of composite articles.

2. Description of the Prior Art

Various manufacturing methods are used in the fabrication of composite articles. These various manufacturing methods are broadly classified as closed mold and open mold processes. Closed mold processes can be cost effective when molding relatively small articles, but becomes cost prohibitive when molding large articles, such as boats, because large and intricately matched tooling becomes too expensive. Therefore, most large composite articles are currently manufactured using open molds.

Open mold processing used in the manufacture of composite articles involves the positioning of reinforced fiber material in a single open mold cavity and spraying or flow coating the reinforcements with liquid curable resin. A variation of this method involves chopping fiberglass in front of the resin spray stream. In this case the reinforcements and curable resin are deposited simultaneously in the mold. A significant drawback to open molding techniques is that during the resin deposition stage large amounts of hazardous air pollutants (HAPs) are emitted, which is a matter of increasing concern to the Environmental Protection Agency (EPA). Therefore, the use of open molds in the fabrication of composite articles is in danger of extinction unless the emission of HAPs can be significantly reduced. Already, Maximum Achievable Control Technology (MACT) Standards are being imposed on the industry to curb HAP emissions. A solution for reducing HAPs, which is well known in the art, is to enclose the open mold apparatus within a vacuum bag during resin infusion. This process is sometimes referred to as vacuum assisted resin transfer molding (VARTM).

The VARTM process typically requires that the reinforced fiber material be positioned over the surface of an open mold. A vacuum bag comprised of flexible polymeric film material is then placed over the reinforcing fiber material and sealed. Resin is introduced into the interior of the vacuum bag after vacuum pressure is applied to draw the resin through the reinforcing fiber material. Once the resin is fully cured, the vacuum bag must be removed from the molded article and either discarded or reused. A significant advantage to the use of a vacuum bag is that HAPs generated from resin transfer are reduced.

One important factor, which must be carefully monitored when using a vacuum bag in resin transfer molding is the formation of air pockets, voids, and/or dry spots in the composite. These types of defects can form between the vacuum bag and/or within the reinforced fiber material, causing both structural deficiencies and aesthetic damage to the composite article. Additionally, wrinkles can form on the surface of the vacuum bag and transfer to the surface of the reinforcing fiber material, causing part defects. Although slowing down the evacuation process can reduce the occurrence of air pockets, voids, dry spots and/or wrinkles, it also results in reduced production rates, and therefore increased costs. Any air pockets, voids, dry spots or wrinkles which do form must be manually eliminated via a time-consuming manual smoothing process, which can cause perforation of the vacuum bag or seam separation if not executed properly, and also slows production rates. Any leaks in the bag will cause air to be introduced into the resin stream. This problem causes a quality issue commonly called "bubble trails". Such defects that are not corrected during the molding process require costly reworking.

Various alternative approaches have been proposed to improve on the composition of the vacuum bag in order to reduce the formation of air pockets and wrinkles and the attendant defects. For example, U.S. Pat. No. 5,129,813 to Shepard discloses a pre-formed vacuum bag comprised of a non-porous material having a three-dimensional pattern, which allows the resin to flow through a series of interconnected channels, therefore minimizing the entrapment of air. Significantly it has been found that vacuum bags manufactured in accordance with the aforementioned prior art can be labor-intensive, and therefore costly. First, care must be taken to ensure that the vacuum bag is capable of a controlled collapse during evacuation; otherwise air pockets, voids, dry spots and/or wrinkles can form. Moreover, the pre-formed vacuum bag must be carefully constructed such that no tension exists in the non-porous material. Finally, reuse of the bag is discouraged, therefore resulting in unwanted solid waste.

It is also known in the prior art to use a sheet of textured film and tape to form an envelope as an alternative to a costly pre-formed vacuum bag. For example, U.S. Pat. No. 5,837,185 to Livesay et al. discloses this technique. One important factor, which must be carefully monitored when employing this method, is that the mold, seal and envelope must be thoroughly checked to ensure that no air leaks are present. Leaks could result in the formation of air pockets, voids or dry spots, and can cause defects in the laminates or HAPS emissions into the atmosphere. Additionally, as with the aforementioned preformed vacuum bag, the textured film and tape are not reusable, therefore generating unwanted solid waste.

A reusable vacuum bag as an alternative to the wasteful non-reusable methods discussed herein is disclosed in U.S. Pat. No. 5,716,488 to Bryant. Significantly, it has been found that reusable vacuum bags can be costly and time-consuming to fabricate. First, costly silicone rubbers capable of withstanding repeated applications must be used. Second, the fabrication of the reusable vacuum bag requires a labor-intensive process involving elaborate piecing and seaming to protect against air leaks. Third, a different reusable vacuum bag must be made to allow for different sizes and shapes of composite articles. Fourth, reusable vacuum bags require regular maintenance such as repairing, cleaning and storing. Finally, the operational life of the reusable vacuum bag is limited, and the vacuum bag must be eventually discarded and replaced.

A recent advancement in vacuum bag molding is to incorporate structural framing members prior to the commencement of resin. This adds to the complexity of the vacuum bag configuration and amplifies the difficulty of placing the bag and ensuring that the bag is completely sealed.

Accordingly, it would be desirable to provide a process for the manufacture of composite articles that can protect against the formation of air pockets, voids or dry spots; thereby significantly reducing the number of damaged parts. It would also be desirable to provide a process, which can prevent the emission of HAPs, without the high material and labor costs, and the generation of solid waste attendant with the prior art. Finally, it would be desirable to provide a process that would allow the unfinished side of the composite article to have a desired finish, eliminating the need for an additional finish to be applied. Commonly, unsaturated polyester gel coat materials or paints are applied to the unfinished side of the composite article. These finishing materials further add to the HAPS emissions during the manufacturing process.

SUMMARY OF THE INVENTION

The inventive method concerns a process of transferring resin into reinforcing material used in the manufacture of composite articles. A first step in the method involves positioning at least one layer of the reinforcing material on the surface of an open mold. Subsequently, a sealant layer is applied in liquid form over the reinforcing material to create an airtight chamber encapsulating the reinforcing material between the sealant layer and the mold. After the sealant layer is allowed to cure, a vacuum pressure is applied to the airtight chamber to draw resin through the reinforcing material. For example, the resin can be a polyurethane, polyurea epoxy, polyester, vinyl ester resin, or any other curable liquid resin system. According to one aspect of the invention, prior to the first step of positioning the reinforcing material on the surface of the mold, an optional gel coat layer can be applied to the mold surface.

The sealant layer can be applied using a spraying process. For example, a sealant layer spray coated to a thickness of between approximately 1 to 200 mils has been found to provide an acceptable result. The sealant layer is typically comprised of a polyurea or polyurethane elastomeric material.

According to yet another aspect of the invention, the polurethane or polyurea formulation can be modified to in order to add enhanced properties, such as improved chemical resistance, moisture resistance, abrasion resistance, ultraviolet light resistance to provide the desired final finish, thereby eliminating the additional step of painting or applying a gel coat.

According to one embodiment, optimal placement of the vacuum and resin ports can be achieved by utilizing a special purpose nozzle assembly designed to pierce the sealant layer for access into the airtight chamber. The inventive method allows for the special purpose nozzle assembly to comprise the vacuum port, the resin port, or both.

Another embodiment for placement of vacuum and resin ports is to place the ports onto the laminate prior to the application of the bag sealant. After placement, the ports can be sealed to the laminate during the application of the bag sealant. After molding, the exposed protruding tip of the port can be optionally cut flush with the laminate surface.

Yet another embodiment is the method of sealing the flange of the mold. The advantage of the sprayable bag here is that overlaps pleats or seams in the bag do not complicate flange sealing. Resin injection and/or vacuum channels can easily be accommodated by using channel details molded into the flange or by placing a manifold system or resin transfer media on the flange prior to the application of the sprayable bag material.

The reinforcing material can consist of any material suitable for improving the strength of the composite piece under construction. According to one aspect of the invention, the reinforcing material can comprise fibers, flakes, tapes, films, reinforcing bars, tubes or webs. If a fiber reinforcing material is selected, the fibers can be chosen to include any suitable reinforcing fiber such as glass, carbon, aramid, linear polyethylene, polypropylene, nylon, or polyester fibers. According to another aspect of the invention, the reinforcing material can include flakes. The material of the flakes can be selected to include any suitable reinforcing material. For example, mica, quartz, glass and metal flakes can be suitable for this purpose. According to another aspect, the reinforcing material can be selected to include tapes. The material for the tape can also be selected from any suitable reinforcing material. For example, metal or polymer tapes can be acceptable for this purpose. Alternatively, the reinforcing material can consist of tubes and/or reinforcing bars. The tubes and/or reinforcing bars can be formed of metal, but polymer materials can also be used for this purpose. The reinforcing material can also be selected to include at least one film material. The film can be formed of a material selected from any of a wide variety of strength enhancing materials. For example, films formed of polyester, acrylic, polycarbonate, thermoplastic polymer, and thermosetting polymer can be used for this purpose.

According to yet another aspect of the invention, the reinforcing materials can also include various types of honeycomb core materials. Such honeycomb core materials can be formed from a wide variety of materials such as metal, composites, or thermoplastics. Honeycomb cores are commonly used in composite manufacturing for all types of structures. Other core materials, such as polypropylene foams, nylon foams, polyester foams, and balsa can also be used as reinforcing materials.

DETAILED DESCRIPTION OF THE PREFERRED EMBODIMENTS

Figure 1:
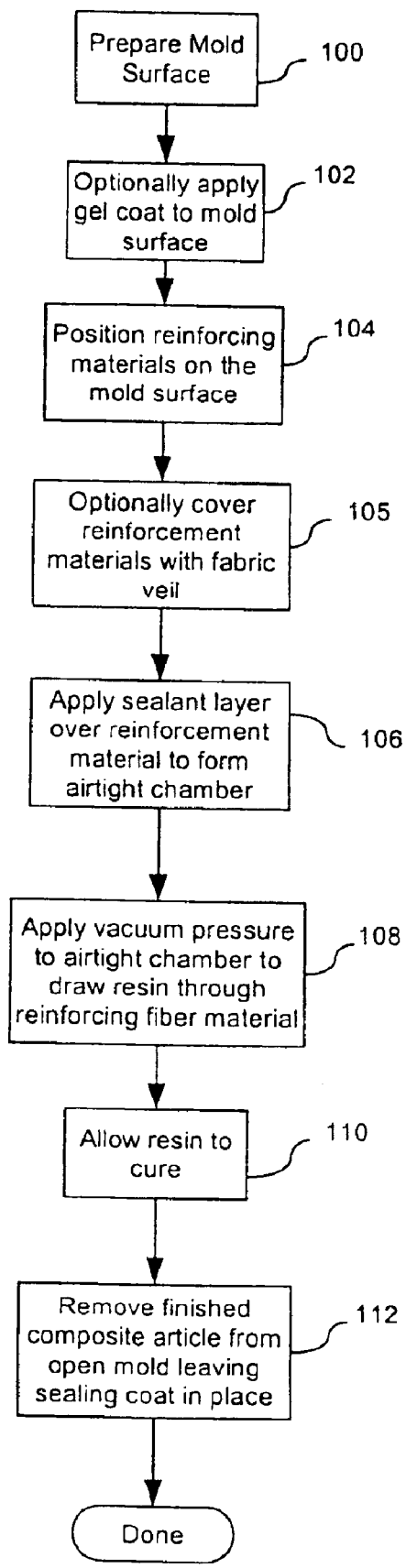
FIG. 1 is a flow chart that is useful for understanding the process according to the inventive arrangements.
Figure 2:
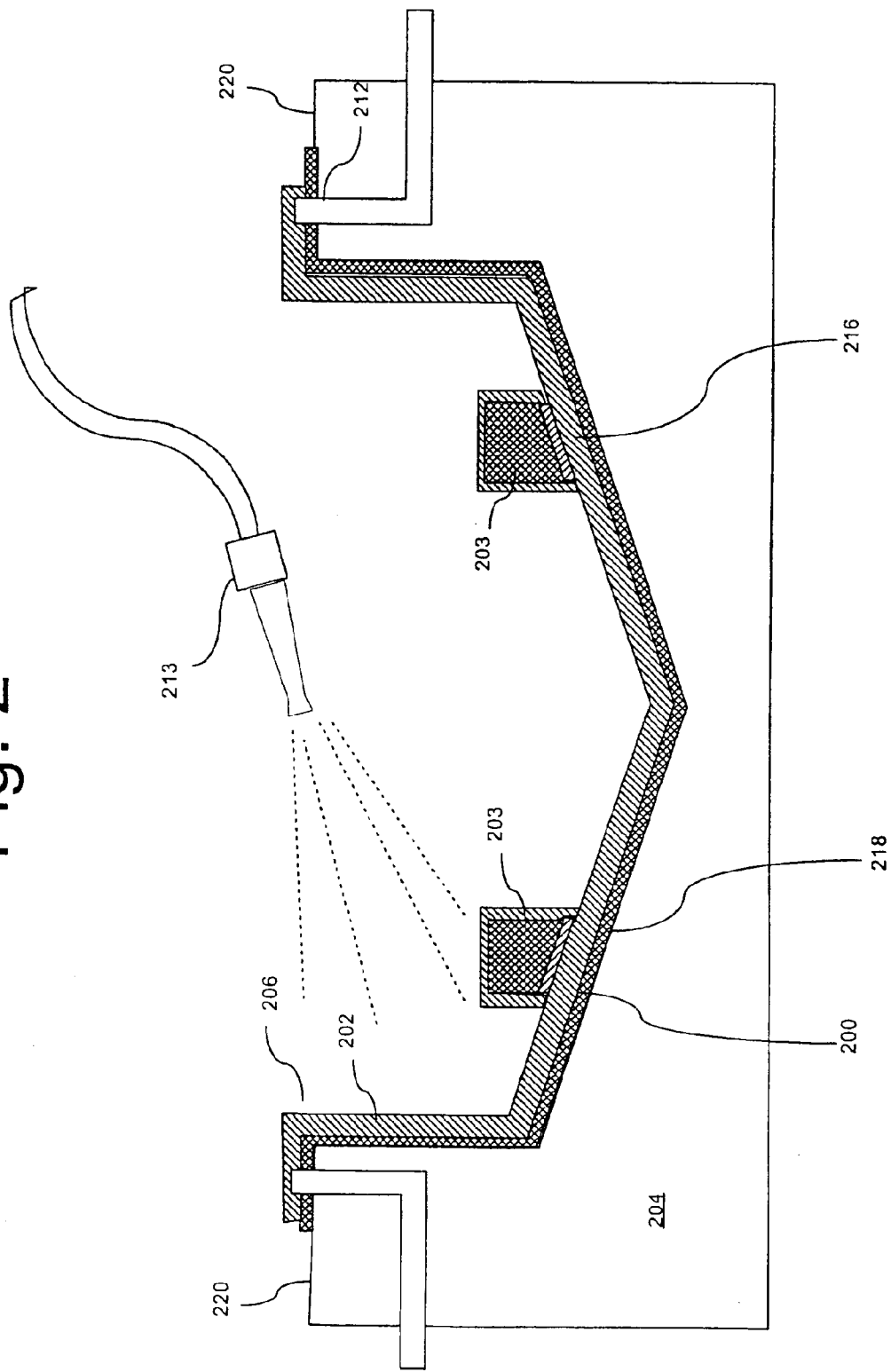
FIG. 2 is a cross-sectional view of a vacuum assisted resin transfer molding assembly showing a process for spraying on a liquid sealant.

FIG. 1 is a flow chart that shows a process for vacuum assisted resin transfer molding (VARTM) according to the inventive arrangements. The process will be described relative to the cross-sectional view of a mold assembly in FIG. 2. The composite part in FIG. 2 is a boat hull, but it will be readily appreciated by those skilled in the art that the invention is not so limited.

The process preferably begins in step 100 with the preparation of the mold 204. Mold 204 is preferably an open face mold in which the mold surface 218 has a shape that is consistent with a desired composite part to be formed using the process. A flange 220 is preferably provided at the outer periphery of the mold 204. It can be desirable to prepare the mold surface 218 using conventional methods, such as treating the mold surface with wax or the like. However, the invention is not limited in this regard and any other suitable process can be used to prepare the mold 204.

Once the mold surface 218 has been properly prepared, the process continues with optional step 102 of FIG. 1, in which a conventional gel coat 200 can be applied to the mold surface 218. Gel coats and the methods used to apply them are well known in the art. The gel coat 200 can be applied to the mold surface 218 in any convenient manner known in the art. Suitable materials for the gel coat 200 can include conventional unsaturated polyester resins or thermoformed plastics. However, the invention is not limited in this regard and those skilled in the art will appreciate that any other suitable finish layer can be used. The gel coat is primarily a cosmetic layer and can therefore be omitted if cosmetic considerations are deemed unimportant.

Subsequent to the optional application of the gel coat 200 in step 102, additional materials can be loaded into the mold in step 104. The additional materials can include one or more structural members 203, one or more layers of reinforcing material 202. The structural members can be formed from wood, foams, fiberglass, composites or other materials as may be deemed necessary to add rigidity and strength to the completed product. For example rigid foam filled composite beams as disclosed in U.S. Pat. No. 5,429,066 to Lewit et al. are particularly well suited for use in the present invention.

The reinforcing material 202 can be any combination of fiber mat, knitted fabrics, core materials, and woven roving, all of which are well known to those skilled in the art. The reinforcing materials can also include flakes, tapes, films, reinforcing bars, tubes, honeycombs or webs. The reinforcing material can be formed from any suitable substance that can enhance the overall structural properties of the composite piece under construction by improving characteristics such as strength, impact resistance, or rigidity. For example, flakes can be formed of mica, quartz, glass and metal. Tapes can be formed of metal or polymer materials. If tubes and/or reinforcing bars are used, the tubes and/or reinforcing bars can be formed of metal, but polymer materials can also be used for this purpose. If a film is used, it can be selected to include any of a wide variety of strength enhancing sheet-like materials. For example, films formed of polyester, acrylic, polycarbonate, thermoplastic polymer, and thermosetting polymer can be used. The sheets can be solid or perforated.

Honeycomb core materials can be formed from a wide variety of materials such as metal, composites, polymers or thermoplastics. Honeycomb cores are commonly used in composite manufacturing for all types of structures. Other core materials, such as polypropylene foams, nylon foams, polyester foams, and balsa can also be used as reinforcing materials in the present invention.

If the reinforcing material 202 is a fiber material, the it can be selected to include a directional reinforcing fiber layer of organic or inorganic structural reinforcing fibers such as glass fibers, carbon fibers, aramid fibers which is available from DuPont Corporation under the trade name Kevlar, linear polyethylene or polypropylene fibers such as is commercially available from Allied-Signal, Inc. under the trade name Spectra, or polyester fibers. However, it should be understood that the invention is not so limited. Instead, the phrase "reinforcing fiber" is meant to include any fiber or fibrous material which, when added to a composite material, enhances the structural properties of the material. The fibers can be randomly oriented, chopped strand, or preferentially, they can be oriented in one or more directions. While a number of specific types of materials have been given for use as the reinforcing material 202, it will be appreciated by those of ordinary skill in the art that other equivalent-type reinforcing materials can be employed in the practice of the invention.

Figure 3:
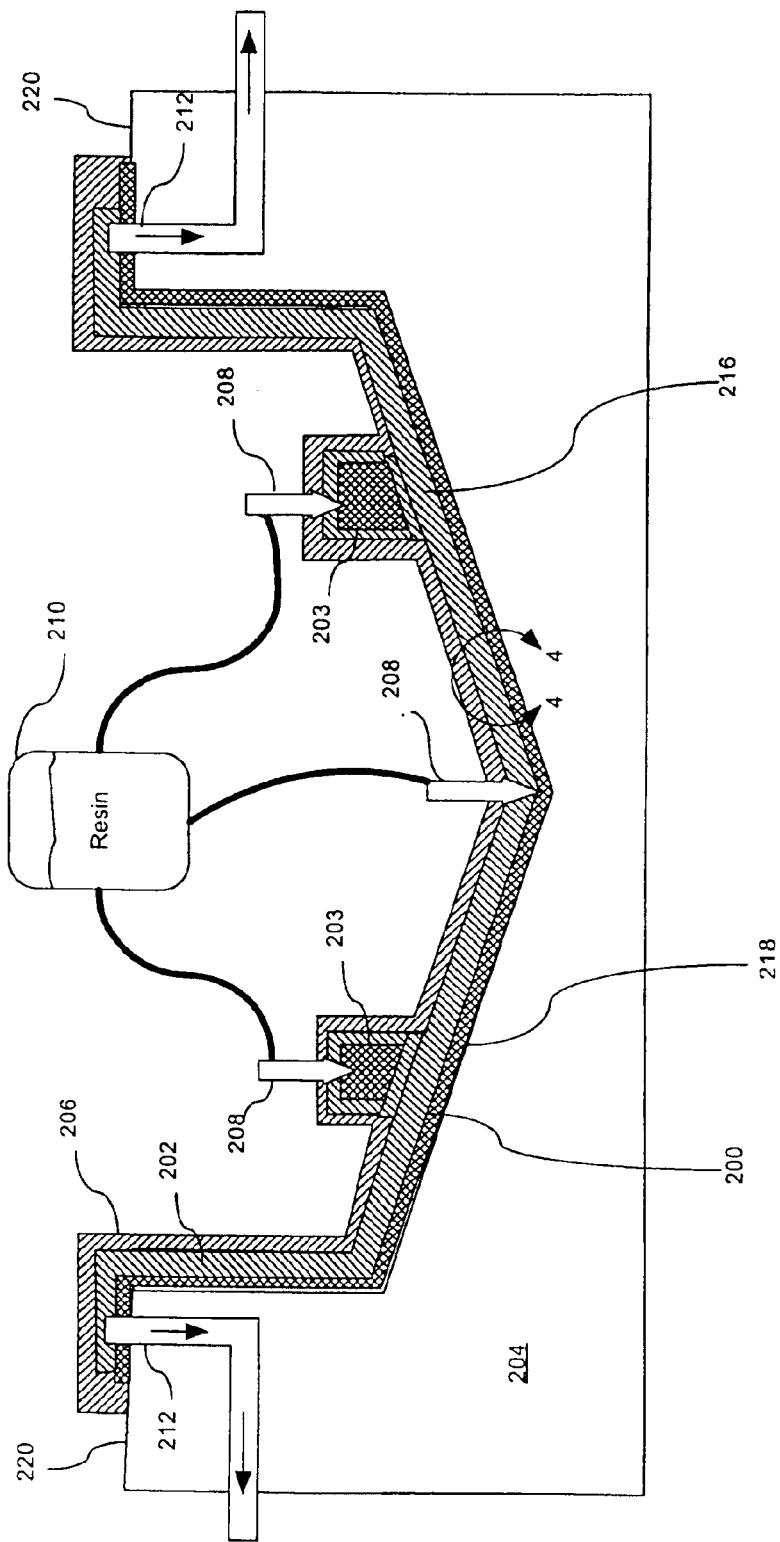
FIG. 3 shows how resin can be injected in the vacuum assisted resin transfer molding assembly of FIG. 1 after the liquid sealant has been applied.

As shown in FIG. 3, the mold 204 can have one or more ports 212 and 208 for connection to a vacuum pump (not shown) and a resin source 210, respectively. In FIG. 3, the resin ports 208 are located at various points for distributing resin throughout the reinforcing material 202. One or more vacuum ports 212 can be located on opposite sides of the mold 204, directly below the flange 220 near the outermost edge of the reinforcing material 202. However, the invention is not so limited and those skilled in the art will appreciate that vacuum ports and resin infusion ports can be located on other parts of the mold 204. The resin ports 208 can be installed so that they directly infuse resin to the reinforcing material 202. Alternatively, the resin ports can be arranged to feed flow channels 209 that are designed to more equally distribute the resin to all portions of the reinforcing material.

Once the reinforcing material 202, structural members 203 and any necessary ports have been positioned, the process continues in step 106 with the application of a sealant layer 206. The sealant layer 206 is preferably applied in liquid form over the entire surface of the reinforcing material 202 and the flange 220. Any suitable technique can be used to apply the sealant layer 206. For example, the sealant can be applied with a spray gun, a brush, a roller, or a flow coater (non-atomized spray) over the reinforcing materials.

Figure 4:
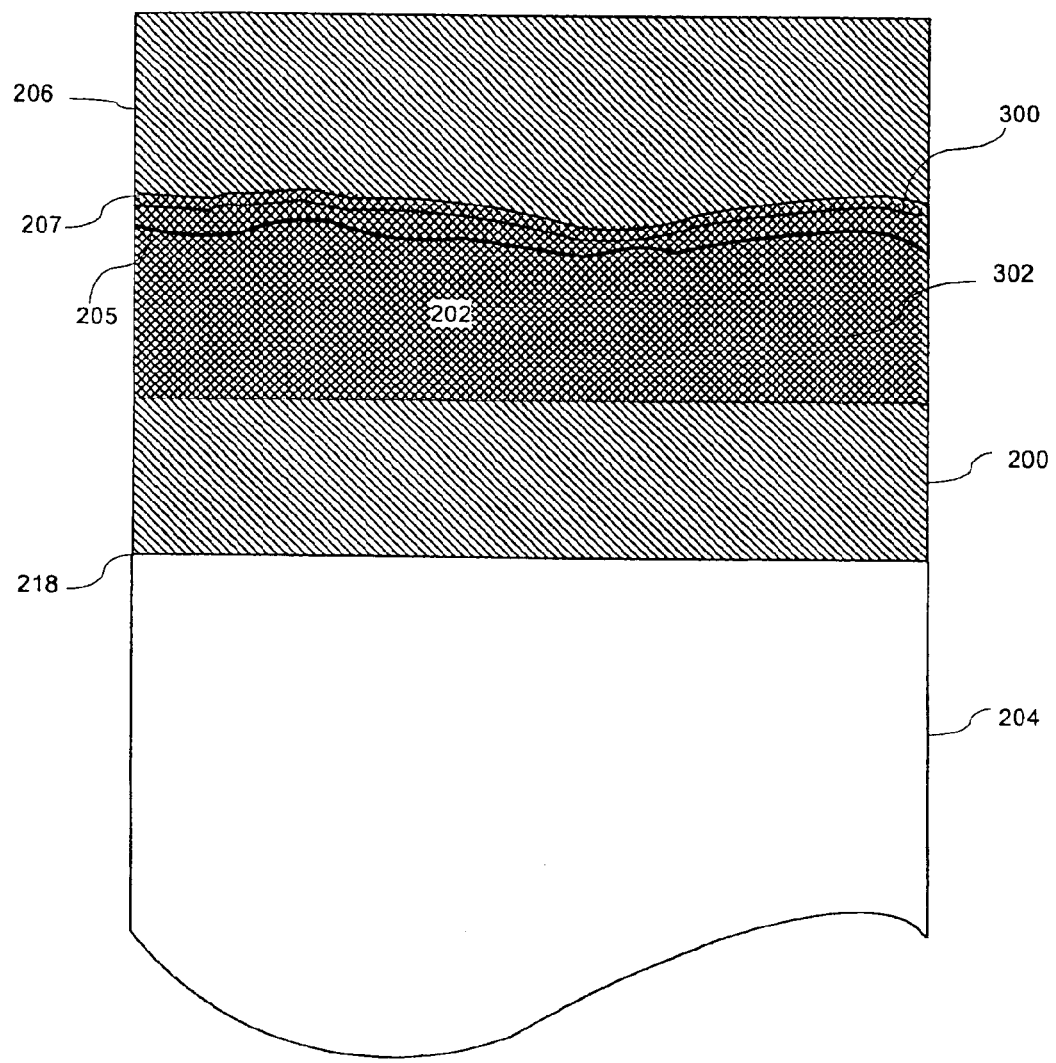
FIG. 4 is an enlarged partial cross-sectional view of the vacuum assisted resin transfer molding assembly of FIG. 3.

In step 106, it is preferred that the liquid sealant not substantially penetrate through the reinforcing material 202. To this end, the sealant material used in the invention is preferably selected to have a sufficiently high viscosity and fast cure property so that the uncured liquid sealant has only limited opportunity to penetrate through the reinforcing material 202. This limited penetration is illustrated in the enlarged cross-sectional view of FIG. 4. As illustrated therein, the viscosity of the sealant material can be selected so that it penetrates only an outer portion 300 of the reinforcing material 202.

It is desirable for the liquid sealant to form a permanent airtight outer layer, rather than merely being absorbed into the inner fiber level 302. The precise viscosity required in a particular application for controlling such penetration can be dependent on the density of the fibers or the amount of spacing between them. For example, viscosity in the range of 100 cps to 5000 cps have shown acceptable results, depending on proper formulation of gel and set times of the polyurethane to prevent penetration of the sealant into the reinforcing layers.

For the purpose of further controlling the degree of liquid sealant penetration into the reinforcing material 202, the invention can also include an optional step 105 which involves covering the reinforcing materials 202 with an optional fabric veil 207. The fabric veil can be a light weight fabric having a relatively tight weave so as to further limit the penetration of liquid sealant into the underlying reinforcing material 202.

It is a feature of this invention that, unlike conventional films and vacuum bags which must be taped or clamped around the mold flange and the resin and vacuum ports, the inventive spray coating process provides a convenient and effective means to form a continuous and uniform surface 205 that partially defines airtight chamber 216. The liquid sealant layer 206 also preferably forms a seal around resin ports 208 and around flanges 220. The seal prevents air from being drawn into the airtight chamber and prevent resin from leaking out of the airtight chamber 216.

In general, it is preferred to install the resin ports prior to the application of the liquid sealant layer 206. According to an alternative embodiment, however, one or more resin ports 208 can be installed after the liquid sealant layer 206 has been applied. In that case, a small opening can be formed in the liquid sealant layer 206 through which the resin port can be inserted. Subsequently, additional sealant can be applied around the periphery of the resin port to provide a seal.

The precise thickness of the sealant layer 206 as applied over the reinforcing material 202 and structural members 203 is not critical. However, layers that are too thin may develop pinhole leaks, whereas excessively thick layers can waste material. In this regard, a sealant layer 206 of between 1 to 200 mils has been found to provide an acceptable result.

Once the sealant layer 206 has been applied, the sealant layer 206, and the mold surface 218 respectively form the lower and upper portions of the airtight chamber 216 that encapsulates the reinforcing material 202. Alternatively, if the optional gel coat layer 200 is applied, then the sealant layer 206 and the gel coat layer 200 will define the airtight chamber 216.

The sealant layer 206 may consist of any number of commercially available polyurea, polyurethane, epoxy or any other coating formulations capable of forming a continuous airtight membrane. For example, BASF Corporations HSE-50, a two-component polyurethane/polyurea spray elastomer system has produced desired results. This commercially available system provides a flexible tough monolithic membrane with water and chemical resistance and has a viscosity in the range of 600 to 900 centipoise.

Optionally, the sealant layer 206 may be formulated to provide chemical resistance, moisture resistance, and abrasion resistance, through the judicious use of polyol and/or isocyanate variants. For example, the use of an aliphatic isocyanate can be used to substantially improve resistance to ultra violet light degradation. Consequently, the surface formed by sealant layer 206 can be enhanced with finishing properties associated with the special formulation of the elastomeric coating system.

Subsequent to the application of the sealant layer 206, the process continues with step 108 with the infusion of resin into the reinforcing material 202. The resin is preferably infused by application of a vacuum pressure to the airtight chamber 216, but the process is not so limited. A vacuum pressure, as described herein, can be any pressure that is reduced relative to the outside air pressure surrounding the airtight chamber 216, and is of sufficient force to draw resin through the airtight chamber 216. A range of vacuum pressure from 1 to 28 inches mercury is commonly known in the art. However a range of 18–28 in Hg is preferred for use in this invention.

In operation, a vacuum pressure is applied to the airtight chamber 216 via the vacuum ports 212. Subsequently, the resin is drawn into the airtight chamber 216 through the resin ports 208 and uniformly infused through the reinforcing material 202.

Examples of suitable resins include epoxy, polyester, and vinyl ester type resins, however, this invention is not limited to a particular type of resin provided that it is a curable liquid resin system and is compatible with the reinforcing material 202 and the sealant layer 206 selected. If a gel coat 200 is used, the curable liquid resin system should also be compatible with the gel coat. The resin used in the invention is preferably of a viscosity capable of flowing rapidly and continuously through the reinforced fiber material in a uniform fashion. If the resin is of too high a viscosity, there is a danger of the resin prematurely curing resulting in inadequate infusion. A resin viscosity range of between 1 cps to about 1000 cps is generally accepted in the art. The upper limit to viscosity is a function of the resin distribution system, the porosity of the reinforcement and the porosity of any resin transfer method and/or flow layers (i.e. scored cores). A viscosity range of 100–500 cps has been found to achieve acceptable results in the present invention for a wide range of part sizes.

Once the fiber reinforcing material 202 has been adequately infused with resin, the process continues with curing step 110. The resin can be cured in any conventional manner commonly employed by those skilled in the art. For example, unsaturated polyester resins can be formulated with commercially available initiator systems to cure within a predictable period of time using common catalysts such as methyl ethyl ketone peroxide.

Subsequent to the completion of the curing phase, and prior to the removal of the finished composite article from the mold surface 218, the process continues with with the release of the sealant layer 206 from the flanges 220. According to a preferred embodiment, the release is accomplished through the use of release agents that have been pre-applied to the flange. However, those skilled in the art will appreciate that any other suitable release method can be used.

The process is completed in step 112 by releasing the finished composite article from the mold surface 218. Any excess material around the outer peripheral edge of the product can be trimmed to produce a neat and uniform final product. It should be noted that the sealant layer 206 advantageously becomes a permanent part of the composite article. Moreover, it should be noted that the inner surface of the composite article will possess any finishing properties contained in the formulated elastomeric system described in step 106 of FIG. 1, thereby further eliminating a final manufacturing step as required in prior art.

Figure 5:
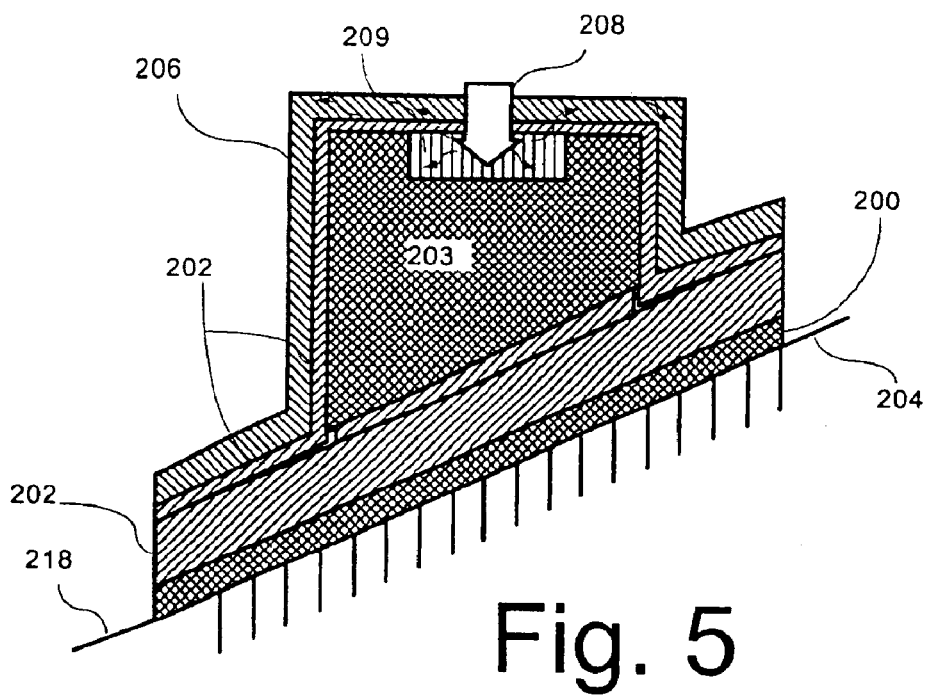
FIG. 5 is an enlarged view of a structural member of the molding assembly showing how a resin port can feed an integrated flow channel.

FIG. 5 is a more detailed view of the structural members 203 of FIG. 3. According to one embodiment, the flow channels 209 can be integrated within the structural members 203 as shown. Any suitable flow channel media can be used to form the flow channel 209 provided that it is capable of efficiently aiding in the distribution of resin to various locations throughout the part. Accordingly, other types of resin feeder systems can also be used for this purpose. Further, the flow channel media need not be limited to the structural members, but can instead be selectively distributed throughout various portions of the reinforcing material 202.

Figure 6A:
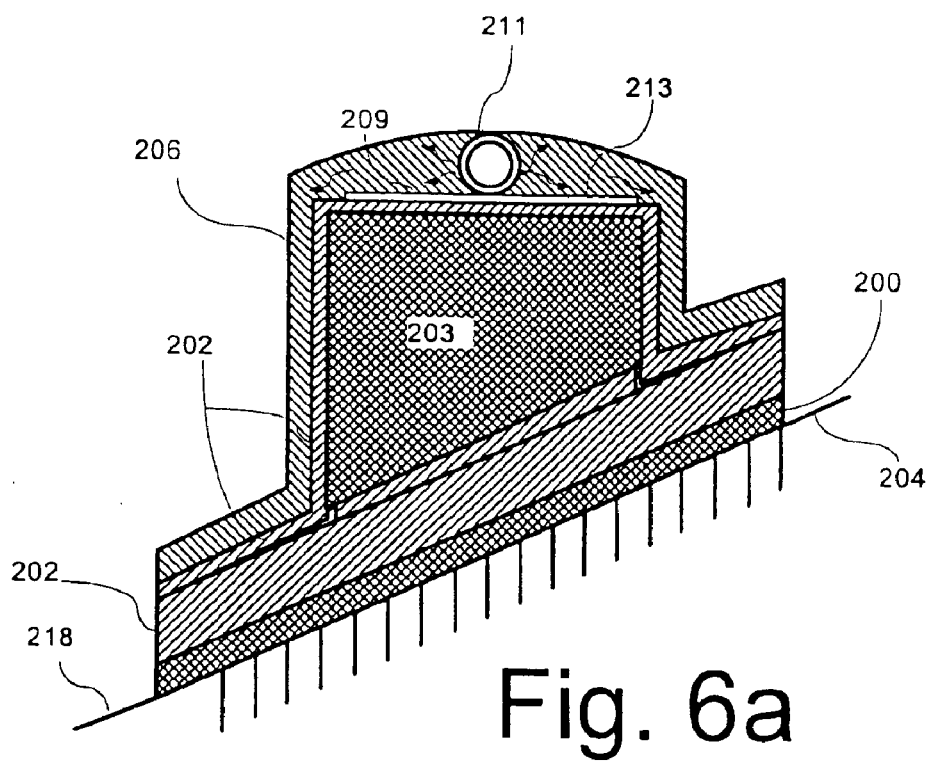
FIG. 6a is an enlarged view of a structural member of the molding assembly showing an alternative embodiment of a flow channel that can be used with the invention.
Figure 6B:
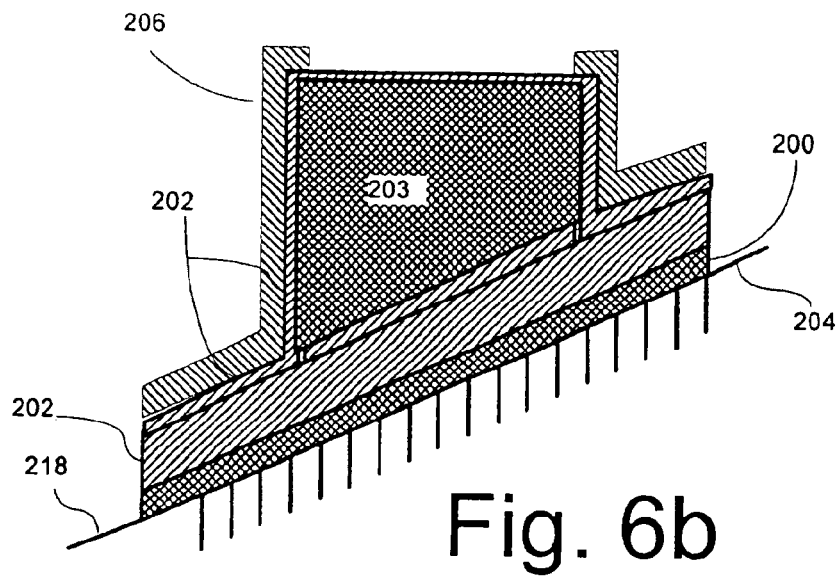
FIG. 6b is an enlarged view of a structural member of the molding assembly of FIG. 6a in which the flow channel has been removed after the resin has cured.

FIGS. 6a and 6b show another example of a flow channel arrangement that can be used with the present invention. As shown in FIG. 6a, the flow channel can be comprised of a feeder tube 211 that is disposed on a peel-ply layer 213. In FIG. 6a, the feeder is disposed on a structural member, but those skilled in the art will appreciate that the invention is not so limited. The feeder tube can be chosen so that it has selectively sized and spaced openings along its length (not shown) to facilitate the distribution and diffusion of resin. For example, a helically wound plastic web forming spiral hose has been found to work well for this purpose.

In some cases it may be desirable to remove the sealant layer from the composite. In the case where a boat deck, for example, is to be adhesive bonded to a hull, the sealant layer may be removed to expose the resin directly to the adhesive. A peel ply material can be used for this purpose. Alternately, a spray applied release material may be used for this purpose. The peel-ply layer 213 can be selected so as to minimize adhesion of the sealant layer 206 to the resin in those areas upon which the peel-ply layer is applied. Consequently, after the curing step 110, a cutting tool can be used to cut away the sealant layer 206 from the region defined by the peel-ply layer 213. Thereafter, the sealant layer 206 and the feeder tube 211 can be removed from the assembly as shown in FIG. 6b. The areas where the peel ply has been removed can be recoated with the liquid sealant for improved finish properties.

Figure 7A:
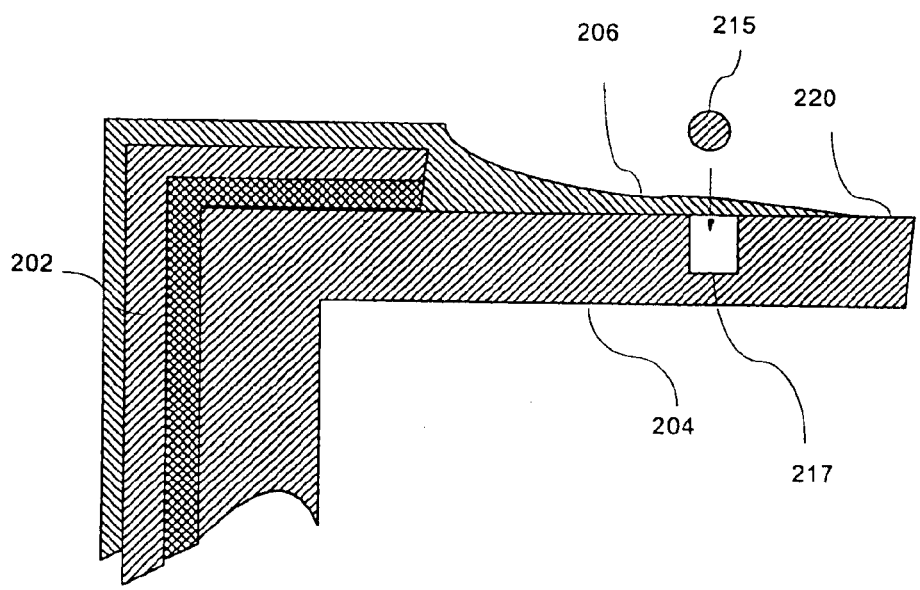
FIGS. 7a and 7b show alternate embodiments of the invention relating to several methods to seal the mold flange.
Figure 7B:
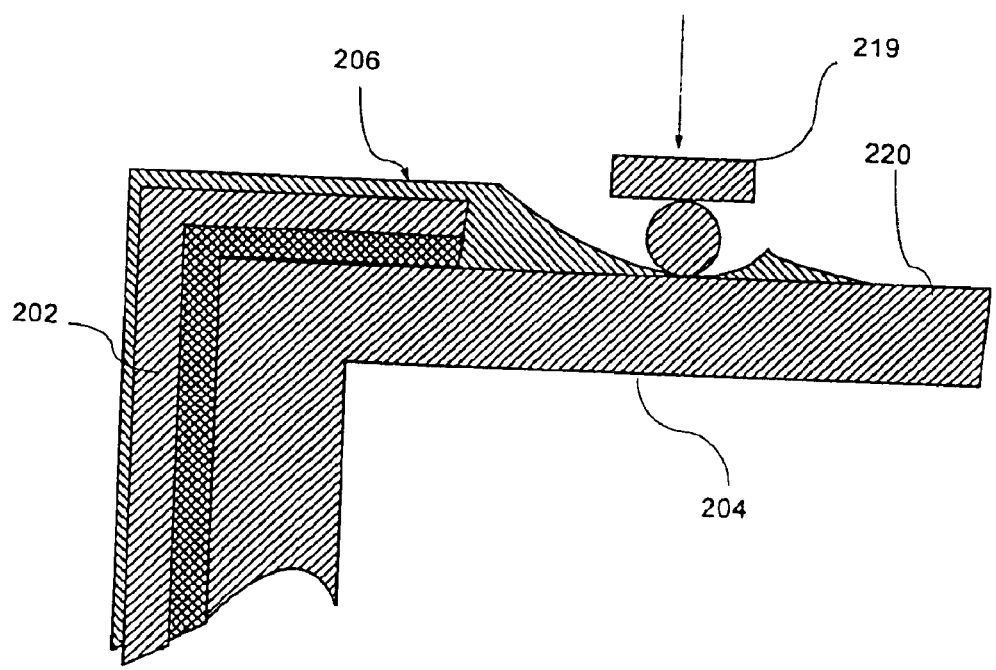

According to a preferred embodiment, the sealant layer 206 is preferably selected to provide good adhesion to flanges 220 so that it forms an air-tight seal around the perimeter of airtight chamber 216. However, if additional sealing steps are required for preventing leakage of air and or sealant into the chamber 216, an improved seal can be obtained using a gasket that may be integrated with or external of the flange 220. FIG. 7a shows an integrated gasket arrangement in which a channel 217 is provided in flange 220. After application of sealant layer 206, a gasket 215 can be inserted in the channel as shown to provide improved sealing. Alternatively, an external gasket arrangement can be comprised of a gasket frame 219 that can simply be clamped on top of the sealant layer 206 as shown to prevent leakage of air and/or resin.

According to yet another embodiment of the invention, the sealant layer 206 can be formed of a dissolvable solvent based material. In that case, the sealant layer can be removed after the resin infusion and curing steps so as to leave an exposed and cured resin surface. For example poly-vinyl acetate (PVA) is a sprayable material that is dissolvable in water but not resin. This material could be applied in a layer of sufficient thickness and rigidity to contain the resin during the infusion and curing process. Other materials that can be used for this purpose include styrene maleic anhydride copolymer systems, and cellulose based systems that are water soluble. After the resin has been allowed to cure, the sealant layer can be removed by application of a suitable solvent, such as water.

What is claimed is:

1. A method for transferring resin into reinforcing material used in the manufacture of composite articles comprising the steps of:
    positioning at least one layer of said reinforcing material in a mold;
    applying a sealant layer in liquid form over said reinforcing material and curing said sealant layer to form an airtight chamber encapsulating said reinforcing material between said cured sealant layer and said mold;
    applying vacuum pressure to said airtight chamber for drawing resin through said reinforcing material.

2. The method of claim 1 further comprising the step of applying a gel coat layer to said mold prior to said positioning of said reinforcing material.

3. The method of claim 2 further comprising the step of selecting said gel coat layer from the group consisting of unsaturated polyester resins.

4. The method of claim 1 further comprising the step of selecting said reinforcing material to have a form selected from the group consisting of flakes, tapes, films, reinforcing bars, tubes, honeycombs and webs.

5. The method of claim 4 further comprising the step of selecting said reinforcing material from the group consisting of mica, quartz, glass, metal, polyester, acrylic, polycarbonate, thermoplastic polymer, and thermosetting polymer.

6. The method of claim 1 further comprising the step of selecting said reinforcing material to include flakes.

7. The method of claim 6 further comprising the step of selecting said flakes to be formed of a material selected from the group consisting of mica, quartz, glass and metal.

8. The method of claim 1 further comprising the step of selecting said reinforcing material to include at least one tape.

9. The method of claim 8 further comprising the step of selecting said tape to be formed of metal.

10. The method of claim 1 further comprising the step of selecting said reinforcing material to include at least one of a tube and a reinforcing bar.

11. The method of claim 10 further comprising the step of selecting said reinforcing material to be formed of metal.

12. The method of claim 1 further comprising the step of selecting said reinforcing material to include at least one film.

13. The method of claim 12 further comprising the step of selecting said film to be formed of a material selected from the group consisting of polyester, acrylic, polycarbonate, thermoplastic polymer, and thermosetting polymer.

14. The method of claim 1 further comprising the step of selecting said reinforcing material to include at least one core material.

15. The method of claim 14 further comprising the step of selecting said core material from the group consisting of honeycomb panels, polypropylene foams, nylon foams, polyester foams, and balsa.

16. The method of claim 1 further comprising the step of selecting a material for said sealant layer from the group consisting of epoxy, polyurea, polyurethane, and a two-component polyurethane/polyurea spray elastomer.

17. The method of claim 16 further comprising the step of formulating said sealant layer for providing at least one of an improved chemical resistance, moisture resistance, abrasion resistance, crack resistance and ultra-violet light resistance.

18. The method of claim 1 further comprising the step of applying said sealant layer using at least one of a brush, a spray, a roller or a flow coat process.

19. The method of claim 1 further comprising the step of applying said sealant layer to a thickness of between approximately 1 to 200 mils.

20. The method of claim 1 further comprising the step of selecting said resin from the group consisting of a polyurethane, polyurea, epoxy, unsaturated polyester, and vinyl ester resin.

21. The method of claim 1 further comprising the steps of:
    prior to said step of applying said sealant, positioning at least one port at a location disposed for communicating said resin to said reinforcing material; and
    applying said sealant layer around a periphery of said port to provide a leak free access for communicating at least one of said vacuum pressure and said resin to an interior of said airtight chamber.

22. The method of claim 1 further comprising the step of providing a resin flow path to said airtight chamber by piercing said sealant layer to define an opening and inserting a resin port within said opening.

23. The method of claim 1 further comprising the step of providing a fabric veil over said reinforcing material prior to applying said sealant layer.

24. The method of claim 1 further comprising the step of positioning at least one structural member in said mold prior to applying said sealant layer.

25. The method of claim 1 further comprising the step of positioning flow media in said mold prior to applying said sealant layer so as to improve resin distribution within said airtight chamber.

26. The method of claim 25 further comprising the steps of:
  positioning a peel-ply layer beneath said flow media prior to applying said sealant layer; and
  removing said flow media after said resin has cured.

27. The method of claim 1 wherein said mold is an open mold.

28. The method of claim 1 further comprising the step of selecting said sealant layer from the group consisting of a poly-vinyl acetate (PVA), cellulose based system and a styrene maleic anhydride copolymer based system.

29. The method of claim 1 further comprising the step of removing said sealant layer after said resin has cured.

30. The method of claim 29 wherein said removing step comprises rinsing away said sealant layer with a solvent.

31. The method of claim 30 wherein said solvent is water.

32. A method for transferring resin into reinforcing material used in the manufacture of composite articles comprising the steps of,
  positioning at least one layer of said reinforcing material in a mold; positioning at least one port at a location disposed for communicating at least one of resin and a vacuum pressure to said reinforcing material;
  applying a sealant layer in liquid form over said reinforcing material and around a periphery of said port;
  curing said sealant layer to form an airtight chamber encapsulating said reinforcing material between said cured sealant layer and said mold; and
  applying vacuum pressure to said airtight chamber for drawing said resin through said reinforcing material.

33. A method for transferring resin into reinforcing material used in the manufacture of composite articles comprising the steps of:
  positioning at least one layer of said reinforcing material in a mold;
  spraying a sealant layer over said reinforcing material and curing said sealant layer to form an airtight chamber encapsulating said reinforcing material between said cured sealant layer and said mold;
  applying vacuum pressure to said airtight chamber for drawing resin through said reinforcing material.

34. A method for transferring resin into reinforcing material used in the manufacture of composite articles comprising the steps of:
  positioning at least one layer of said reinforcing material in a mold;
  positioning a flow media in said mold for improved resin distribution to said reinforcing material;
  applying a sealant layer in liquid form over said reinforcing material and said flow media;
  curing said sealant layer to form an airtight chamber encapsulating said reinforcing material and said flow media between said cured sealant layer and said mold;
  applying vacuum pressure to said airtight chamber for drawing resin through said reinforcing material.

* * * * *